US009022712B2

(12) United States Patent
Klopfenstein, II

(10) Patent No.: US 9,022,712 B2
(45) Date of Patent: May 5, 2015

(54) FASTENER FOR ATTACHING OBJECTS TO CHANNELED MEMBERS

(71) Applicant: James W. Klopfenstein, II, Bluffton, IN (US)

(72) Inventor: James W. Klopfenstein, II, Bluffton, IN (US)

( * ) Notice: Subject to any disclaimer, the term of this patent is extended or adjusted under 35 U.S.C. 154(b) by 181 days.

(21) Appl. No.: 13/943,954

(22) Filed: Jul. 17, 2013

(65) Prior Publication Data

US 2015/0023759 A1   Jan. 22, 2015

(51) Int. Cl.
   *F16B 21/00*   (2006.01)
   *F16B 21/04*   (2006.01)

(52) U.S. Cl.
   CPC ..................... *F16B 21/04* (2013.01)

(58) Field of Classification Search
   CPC .......... F16B 5/10; F16B 5/065; F16B 5/0607; F16B 5/6021; F16B 21/02; F16B 21/04; F16B 21/09; F16B 21/086; F16B 2005/0671
   USPC ......... 411/349, 350, 353, 508–510, 549, 555, 411/965, 969; 52/656.9; 403/381
   See application file for complete search history.

(56) References Cited

U.S. PATENT DOCUMENTS

| | | | |
|---|---|---|---|
| 2,324,268 A * | 7/1943 | Poupitch | 411/549 |
| 2,345,650 A | 4/1944 | Attwood | |
| 2,620,539 A * | 12/1952 | Poupitch | 411/349 |
| 2,684,515 A * | 7/1954 | Zahodiakin | 411/549 |
| 2,737,268 A | 3/1956 | Smith | |
| 2,767,609 A | 10/1956 | Cousino | |
| 2,767,951 A | 10/1956 | Cousino | |
| 2,784,812 A | 3/1957 | Kindorf | |
| 3,060,538 A * | 10/1962 | Simi | 411/549 |
| 3,265,416 A | 8/1966 | Downes | |
| 3,407,454 A * | 10/1968 | Myatt | 411/549 |
| 3,486,205 A * | 12/1969 | Smith | 411/549 |
| 3,868,806 A * | 3/1975 | Dey | 411/353 |
| 3,966,340 A * | 6/1976 | Morris | 403/353 |
| 4,073,113 A | 2/1978 | Oudot et al. | |
| 4,174,008 A * | 11/1979 | Preziosi et al. | 411/353 |
| 4,575,295 A | 3/1986 | Rebentisch | |
| 5,481,842 A | 1/1996 | Gautreau | |
| 5,655,865 A | 8/1997 | Plank et al. | |
| 5,718,549 A * | 2/1998 | Noda et al. | 411/553 |
| 6,682,256 B1 * | 1/2004 | Hor | 403/382 |
| 6,712,543 B1 | 3/2004 | Schmalzhofer | |

(Continued)

OTHER PUBLICATIONS

Fath GmbH, Quick Fixation—Slot10 drawing, 1 page, Jun. 27, 2013.

*Primary Examiner* — Roberta Delisle
(74) *Attorney, Agent, or Firm* — George Pappas

(57) ABSTRACT

A fastener for attaching objects to channeled members wherein the objects have a hole extending therethrough and the channeled members have a longitudinal slot formed between projecting longitudinal walls. The fastener includes a button and a retainer. The button includes an abutment wall, an abutment surface and an axially extending slot. The retainer includes an engagement boss and a head at opposite ends of shaft. The retainer extends through the button slot. For attaching the object, the button extends through the object hole with the abutment wall adjacent the object and the abutment surface adjacent the channeled member. The retainer boss and part of the shaft extend through the longitudinal slot. The retainer is rotated for engaging the longitudinal walls with the boss. The longitudinal walls are sandwiched between the boss and the button abutment surface and the object is sandwiched between the channeled member and the button abutment wall.

36 Claims, 11 Drawing Sheets

(56) References Cited

U.S. PATENT DOCUMENTS

| | | |
|---|---|---|
| 7,052,222 B2 | 5/2006 | Muller et al. |
| 2002/0122691 A1 | 9/2002 | Wood |
| 2003/0183730 A1 | 10/2003 | Landes et al. |
| 2009/0080999 A1 | 3/2009 | Dunn |
| 2010/0272540 A1 * | 10/2010 | Bucker et al. ................ 411/549 |

* cited by examiner

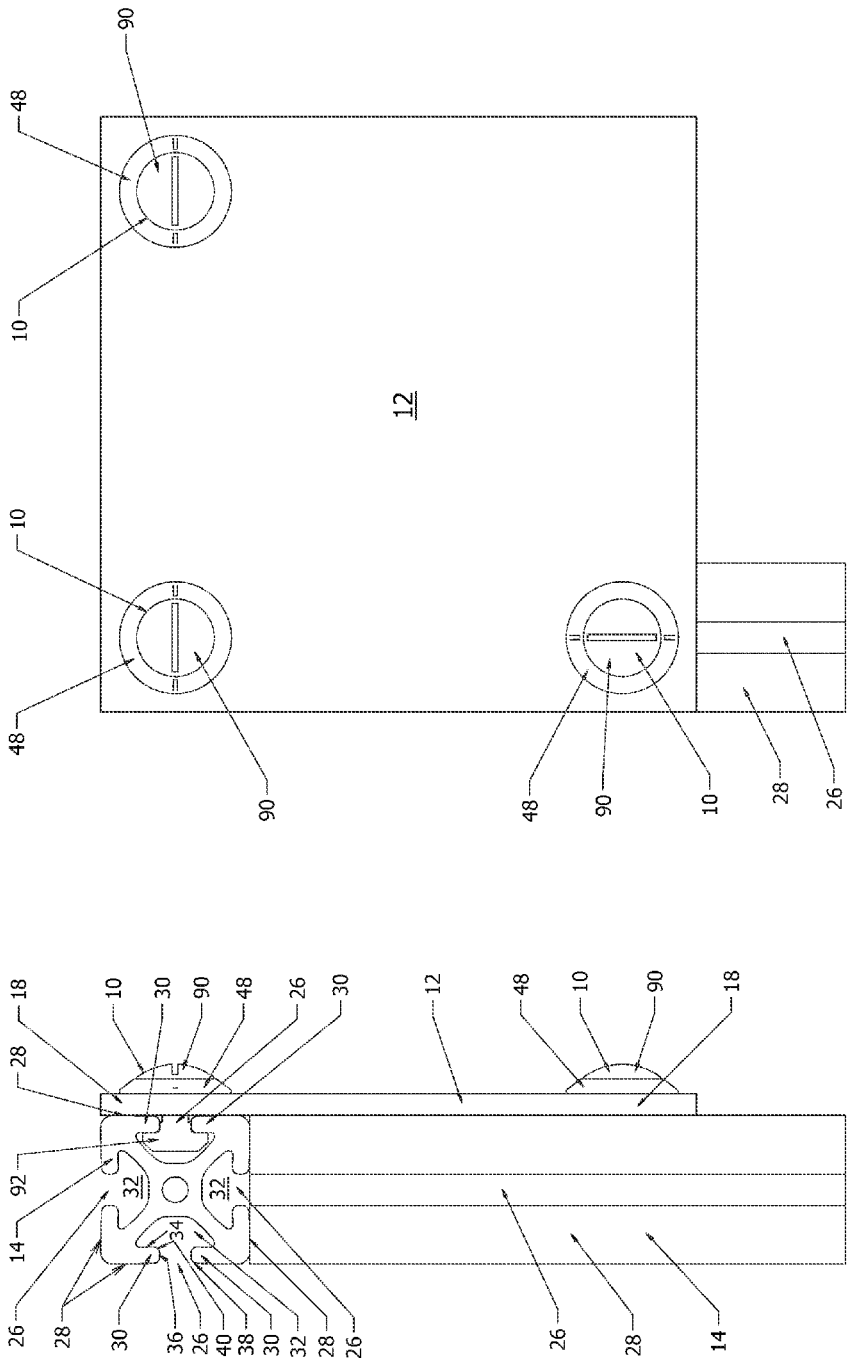

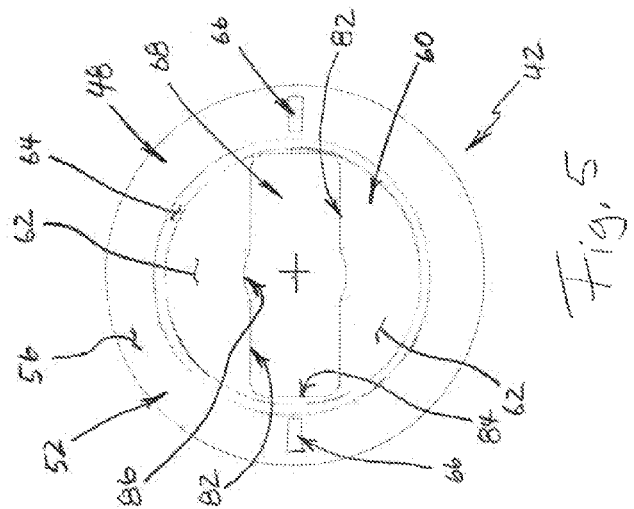
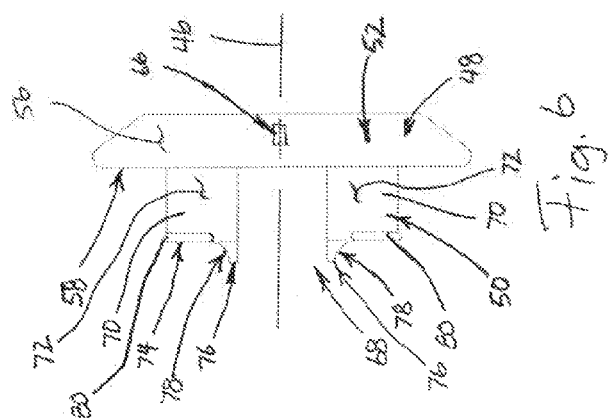
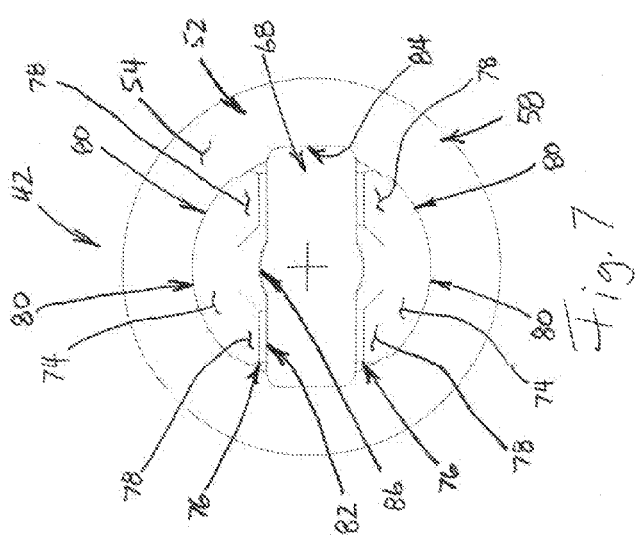
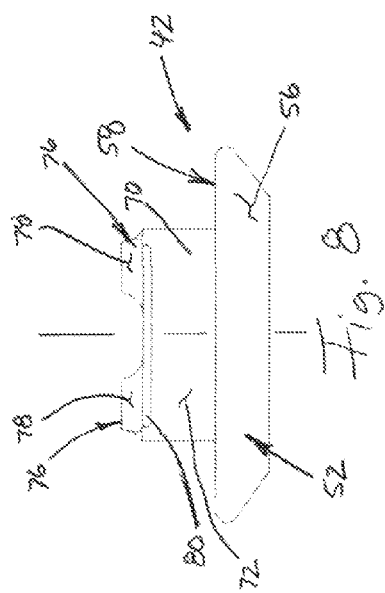

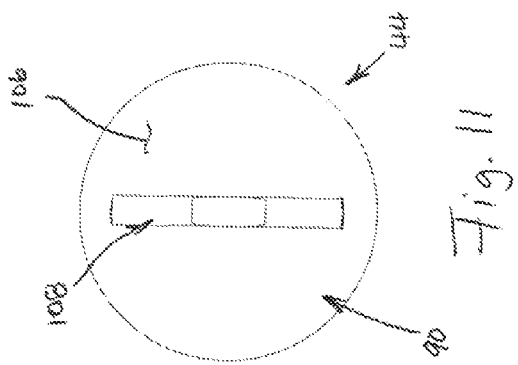
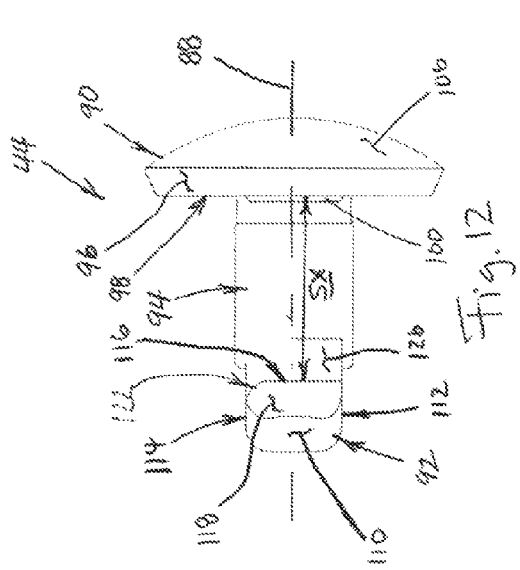
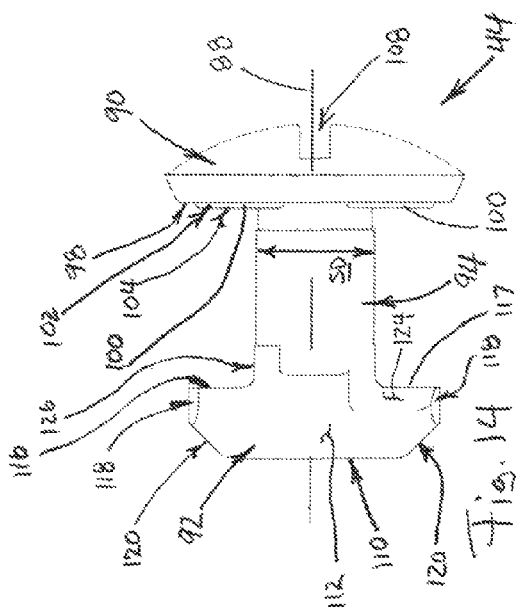
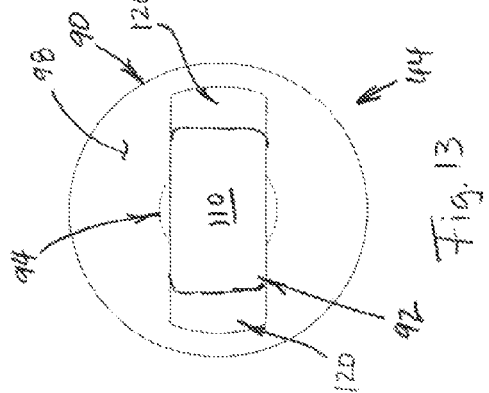

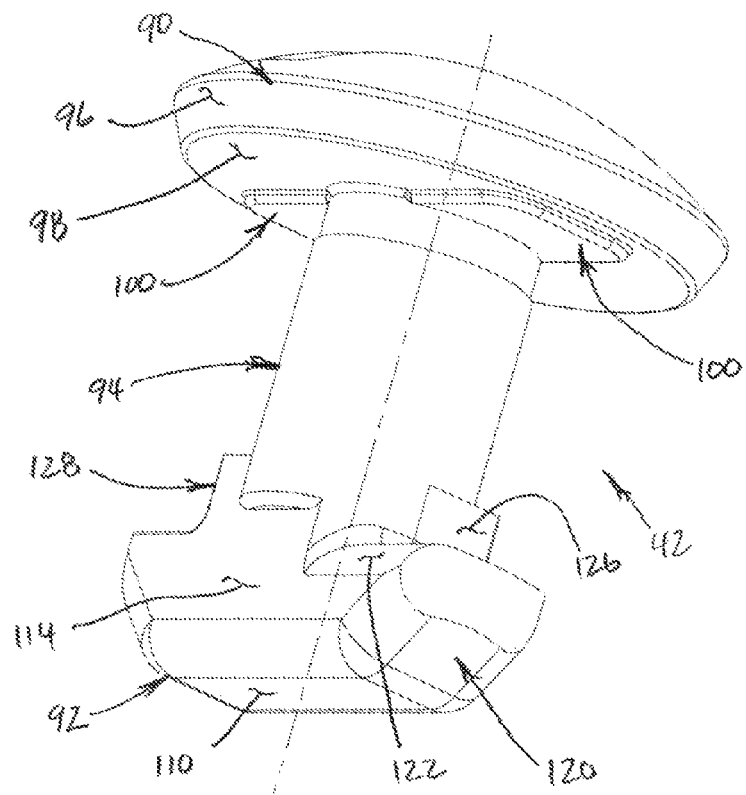
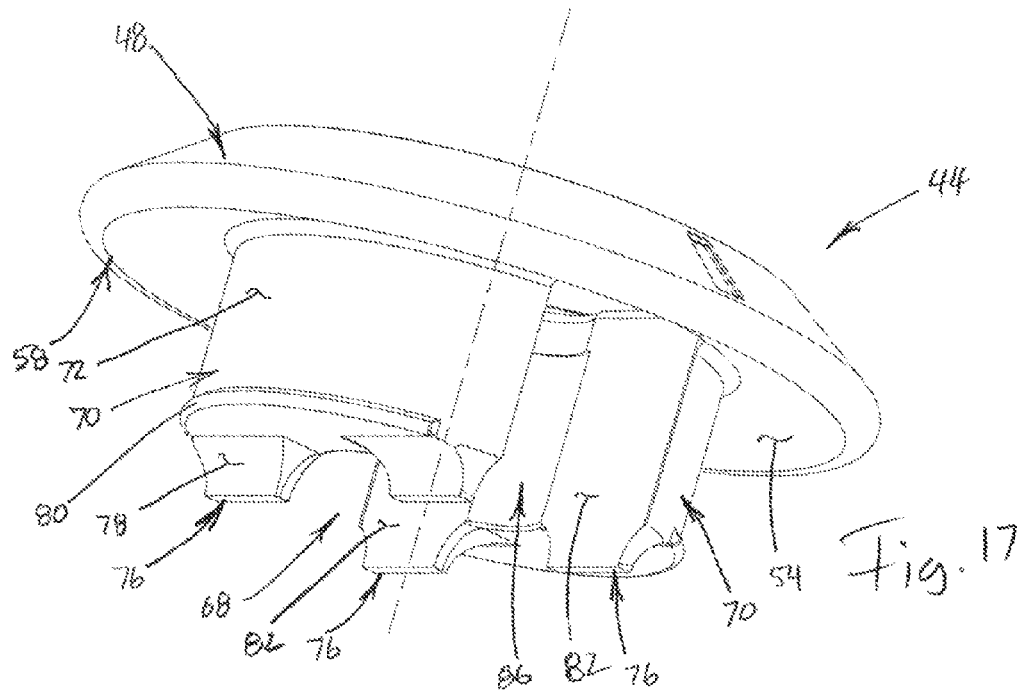
Fig. 17

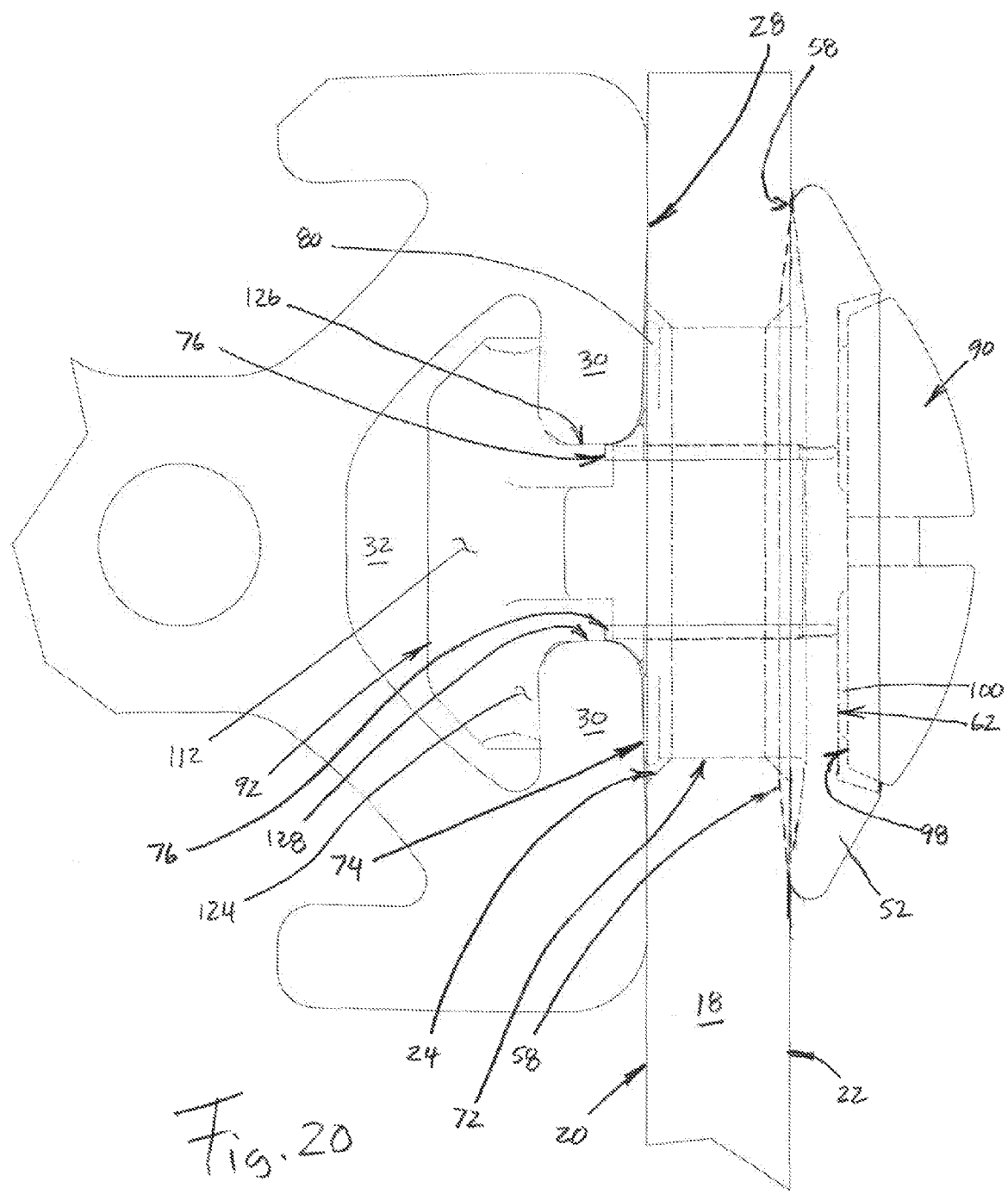

FASTENER FOR ATTACHING OBJECTS TO CHANNELED MEMBERS

BACKGROUND OF THE INVENTION

1. Field of the Invention

The present invention relates to the field of fasteners. More particularly, the present invention relates to a fastener for attaching objects having a hole extending therethrough to a channeled member such as a T-slot member.

2. Background

Channeled structural members such as T-slot extrusion members are today commonly used for assembly of various structures and things. The channeled members include a longitudinal slot formed between projecting longitudinal walls. Objects such as flat planar members, shelves, hooks, etc. are oftentimes secured to the channeled. members.

Fasteners are used to attach such objects to the channeled members. Such fasteners typically take the form of a bolt adapted to extend through a hole in the object and into the channeled member slot. A nut is located within the slot and is drawn onto the bolt for engaging the channeled member projecting walls and thereby frictionally engaging the projecting walls and attaching the object thereto. As is known to those skilled in the art, the use of such currently known fasteners is cumbersome and time consuming.

It is, therefore, desirable to provide an improved fastener for attaching objects, and particularly objects having a planar portion, to channeled members and wherein the fastener can easily and quickly be used and the object can effectively and reliably be secured to the channel member.

SUMMARY OF THE INVENTION

In one form thereof the present invention is directed to a fastener for attaching objects to channeled members, wherein the objects have a hole extending therethrough and the channeled members have a longitudinal slot formed between projecting longitudinal. The fastener includes a button adapted to extend through the object hole and having an abutment wall adapted to abut the object. The fastener also includes a retainer operatively associated with the button and adapted to rotate about an axis. The retainer includes an engagement boss adapted to extend through the channeled member slot and also, upon rotation of the retainer about the axis, engage the projecting walls whereby the object is sandwiched between the button abutment wall and the channeled member.

In another form thereof, the present invention is directed to a fastener for attaching objects to channeled members, wherein the objects have a hole extending therethrough and the channeled members have a longitudinal slot formed between projecting longitudinal walls. The fastener includes a button adapted to extend through the object hole and to be attached to the object. The button has an abutment surface adapted to abut the channeled member. The fastener also includes a retainer operatively associated with the button and adapted to rotate about an axis. The retainer includes an engagement boss adapted to extend through the channeled member slot and also, upon rotation of the retainer about the axis, engage the projecting walls thereof, whereby the channeled member walls are sandwiched between the button abutment surface and the engagement boss.

In yet another form thereof the present invention is directed to a fastener for attaching objects to channeled members, wherein the objects have a planar portion and a hole extending through the planar portion and the channeled members have a longitudinal slot formed between projecting longitudinal walls. The fastener includes a button adapted to extend through the planar portion hole and has an abutment wall adapted to abut the planar portion. The fastener also includes a retainer operatively associated with the button and adapted to rotate about an axis. The retainer includes an engagement boss adapted to extend through the channeled member slot and also, upon rotation of the retainer about the axis, engage the projecting walls thereof, whereby the object planar portion is sandwiched between the button abutment wall and the channeled member.

Preferably, the button further includes an abutment surface adapted to abut the channeled member and wherein, upon rotation of the retainer about the axis, the channeled member walls are sandwiched between the button abutment surface and the engagement boss. The button can include alignment tabs adapted to extend into the channeled member slot. Also preferably, the retainer further includes a raised step adapted to engage a button surface when the retainer is rotated about the axis, whereby a retainer portion between the engagement boss and the button is placed in tension. The retainer engagement boss can further include a rounded surface adapted to slidingly engage and raise the engagement boss over the projecting walls, whereby a retainer portion between the engagement boss and the button is placed in tension. Further preferably, the retainer can include a stop surface adapted to engage a channeled member projecting wall when the retainer is rotated about the axis thereby preventing further rotation of the retainer. The button may also include a shoulder adapted to engage the object and retain the button thereon prior to the rotation of the retainer about the axis. Yet further preferably, the button includes an axially extending slot, the retainer includes a head at a terminal end opposite the engagement boss and the retainer extends through the button slot and the head abuts the button.

BRIEF DESCRIPTION OF THE DRAWINGS

The above mentioned and other features and objects of this invention, and the manner of attaining them, will become more apparent and the invention itself will be better understood by reference to the following description of the embodiments of the invention taken in conjunction with the accompanying drawings, wherein:

FIG. 1 is a top plan view of an object in the form of a flat panel attached to channeled structural members in the form of T-slot extrusions using the fasteners constructed in accordance with the principles of the present invention;

FIG. 2 is a left side elevation view of the drawing of FIG. 1;

FIG. 5 is a top plan view of the button portion shown in FIG. 3;

FIG. 6 is a left side elevation view of the button portion as shown in FIG. 5;

FIG. 7 is a bottom plan view of the button portion as shown in FIG. 5;

FIG. 8 is a bottom side elevation view of the button portion as shown in FIG. 7;

FIG. 11 is a top plan view of the retainer portion shown in FIG. 9;

FIG. 12 is a left side elevation view of the retainer portion as shown in FIG. 11;

FIG. 13 is a bottom plan view of the retainer portion as shown in FIG. 11;

FIG. 14 is a bottom side elevation view of the button portion as shown in FIG. 12;

FIG. 17 is a perspective view similar to FIG. 15 but from another different angle;

Figure 3:
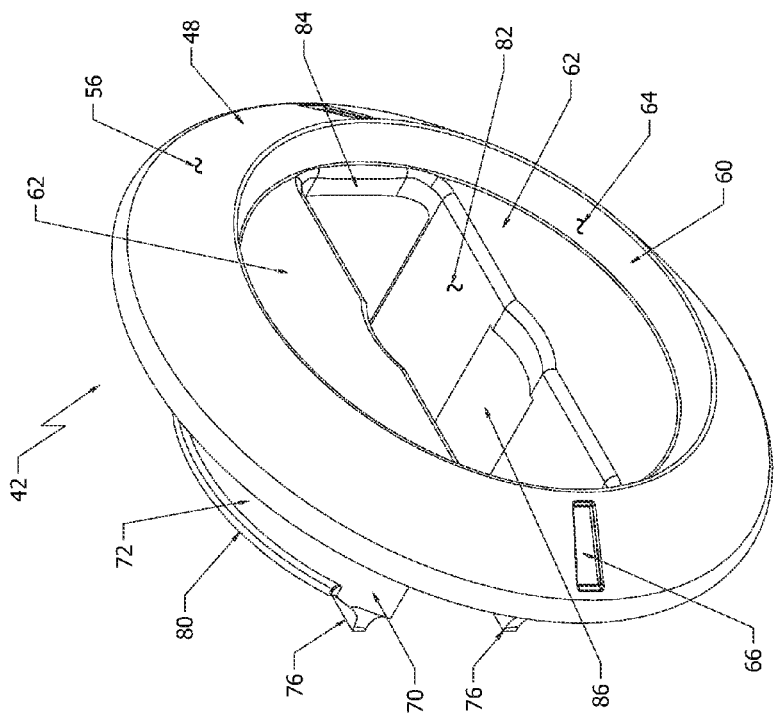
FIG. 3 is a perspective view of a button portion of a fastener shown in FIG. 1.
Figure 4:
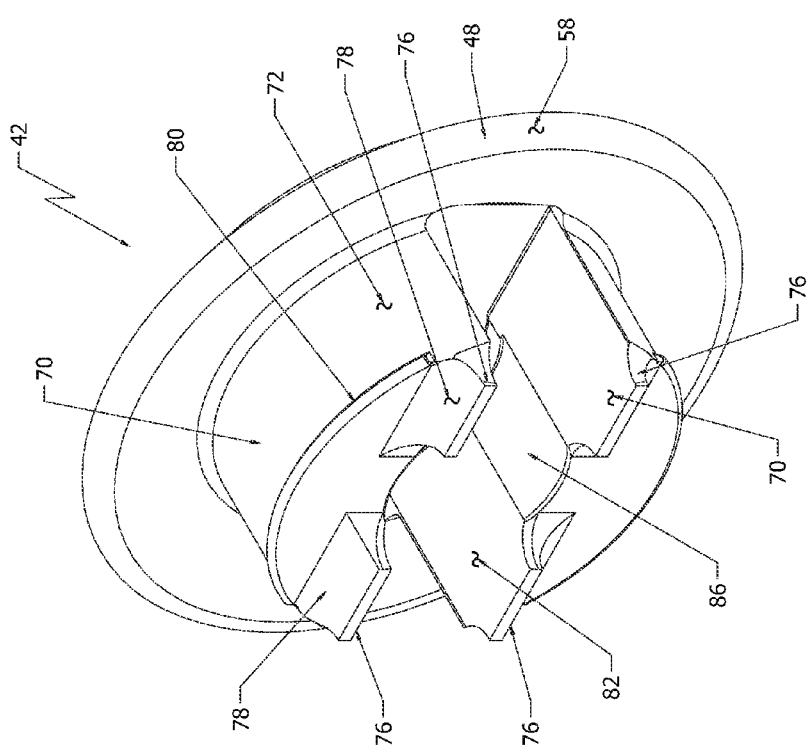
FIG. 4 is a another perspective view of the button portion shown in FIG. 3.

Corresponding reference characters indicate corresponding parts throughout several views. Although the exemplification set out herein illustrates embodiments of the invention, in several forms, the embodiments disclosed below are not intended to be exhaustive or to be construed as limiting the scope of the invention to the precise forms disclosed.

DETAILED DESCRIPTION OF THE PREFERRED EMBODIMENTS

Referring initially to FIGS. 1 and 2, a fastener constructed in accordance with the principles of the present invention is shown and generally designated by the numeral 10. As further described hereinbelow, fastener 10 is used for attaching objects 12 to channeled structural members 14. Objects 12 can be flat panels as, for example, shown in FIGS. 1 and 2 and can take on many other forms and structures including but not limited to hooks, shelves, partitions, screens, etc. Objects 12 can be made of various materials including but not limited to plastics, wood, steel, rubber, etc.

Figure 19:
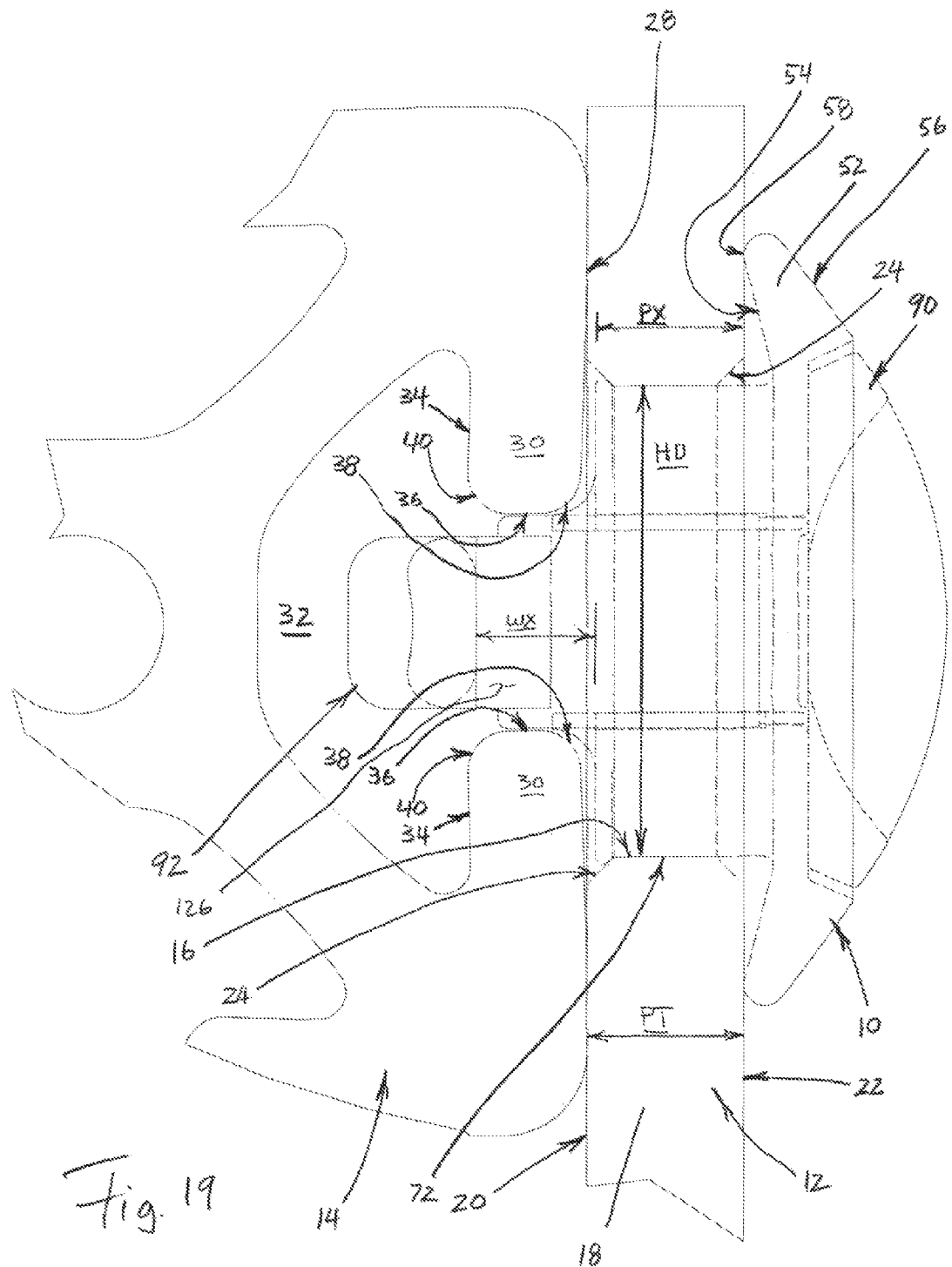
FIG. 19 is aside elevation view of a fastener extending through a planar portion of an object and with the retainer engagement boss inserted through the longitudinal slot and in a detached position; and, FIG. 20 is a side elevation view similar to FIG. 19 but showing the retainer engagement boss rotated clockwise 90° and placed perpendicular to the longitudinal slot in its attached position.

Referring now also to FIG. 19, objects 12 are adapted for use with the fastener 10 by providing a hole 16 extending through a planar portion 18 thereof. Planar portion 18 includes inner and outer surfaces 20, 22 defining a planar portion thickness PT. For accommodating planar portions 18 having a thickness less than PT, washers of various thickness (not show) can be added adjacent the planar portion. In this manner, an effective thickness PT can be provided for use with fastener 10 as more fully described hereinbelow. Hole 16 preferably includes chamfered edges 24 along the inner and outer surfaces 20, 22 and has a diameter HD.

The channeled structural members 14 can be T-slot structural extrusions which are today ell known and commercially available. In FIG. 2 the object 12 is shown secured with fasteners 10 to T-slot structural extrusions 14 having four longitudinally extending slots 26 extending along sides/surfaces 28 which together form a square when viewed from a terminal end thereof or in cross-section. Channeled structural members/T-slot structural members 14 are made of materials such as aluminum, plastic, steel, etc. by extrusion, machining, assembly, etc. in a known and customary manner and can, of course, include a single side 28 with a single slot 26 or multiple sides 28 with corresponding slots 26.

Each of the longitudinal slots 26 is formed between projecting longitudinally extending walls 30 and leads to a longitudinally extending cavity 32. Each of the longitudinally extending walls 30 is defined by an exterior side surface 28, an interior wall surface 34 and a terminal nosing 36. An outside rounded edge surface 38 is provided between the exterior side surface 28 and the terminal nosing 36, and an interior rounded edge surface 40 is provided between the interior wall surface 34 and the terminal nosing 36.

The fastener 10 comprises a button 42 and a retainer 44 which are assembled together and cooperate with one another to engage and secure an object 12 to a channeled structural member 14. More particularly, fastener 10 is adapted to extend through a hole 16 and secure the planar portion 18 of object 12 to the channeled structural member 14 by also extending through a slot 26 and clamping onto the walls 30 thereof.

Referring now more particularly to FIGS. 3 through 8, the fastener button portion 42 includes a longitudinal axis 46. Button 42 comprises a disk shaped section 48 and an axially aligned integrally formed barrel section 50. Disk section 48 includes an annular frustoconical abutment wall 52 defined by an inner frustoconical surface 54, an outer frustoconical surface 56 and an annular abutment surface 58 therebetween. When attaching a planar portion 18 to a channeled structural member 14, the planar portion 18 is sandwiched between the structural member exterior side surface 28 and the disk shaped section 48 with the annular surface 58 of frustoconical wall 52 abutting the outer surface 72 of the planar portion 18.

A disk shaped depression 60 extends into the button disk shaped section 48 from the outer frustoconical surface 56 to a disk shaped surface 62 an axial distance defined by a frustoconical surface 64. Radial location indicating grooves 66 are provided and extend into the abutment wall 52 from the outer frustoconical surface 56. Grooves 66 provide a visual indication of the radial position of button 42 relative to the object 12 and channeled member 14.

A rectangular slot 68 is provided and extends from the disk shaped surface 62 through the disk shaped section 48 and through the barrel section 50. A pair of half-moon shaped projections 70 are thereby defined at the barrel section 50 with the rectangular slot 68 extending therebetween. Projections 70 are mirror images of one another and essentially identical. Each projection 70 includes an outer cylindrical surface 72 extending axially from the inner frustoconical surface 54. The cylindrical surfaces 72 or both projections 70 define a cylinder having diameter which is adapted to be received within the hole 16 of the planar portion 18. The terminal end abutment surfaces 74 of the projections 70 are adapted to abut a channeled member exterior side surface 28. Alignment tabs 76 extend axially from the terminal end surfaces 74 and include a rounded surface 78 adapted to abut an outside rounded edge surface 38 of a projecting longitudinal wall 30.

Semicircular shoulders 80 are located adjacent the terminal end surfaces 74 and project radially beyond the outer cylindrical surfaces 72 a distance slightly greater than the hole 16 diameter HD. Shoulders 80 are adapted to abut the inner surface 20 of the planar portion 18 or, more preferably, the chamfered edge 24 between the inner surface 20 and the hole 16 for thereby detachably retaining the fastener button 42 on the planar portion 18.

Each projection 70 further includes a slot surface 82 extending from the disk shaped surface 62, through the annular abutment wall 52 and the projections 70, and also along the alignment tabs 76. The slot surfaces 82 of each projection 70 are joined at the disk shaped section 48 by connecting surfaces 84. An axially extending trough 86 is recessed into each projection 70 along its slot surface 82 and is centered between the connecting surfaces 84.

Referring now more particularly to FIGS. 9 through 14, the fastener retainer portion 44 includes a longitudinal axis 88. When retainer 44 is received through and is assembled with the button 42, the longitudinal axis 46 of button 42 and the longitudinal axis 88 of retainer 44 are collinear. Retainer 44 comprises a tool engagement head 90, a rectangular shaped engagement boss 92 and a shaft integrally secured with and extending between the head 90 and the boss 92.

Tool engagement head 90 is adapted to be received within the disk shaped depression 60 of the button disk shaped section 48 and, in this regard, includes a frustoconical surface 96 shaped similar to but being radially smaller than frustoconical surface 64. A disk shaped surface 98 extends radially interior of the inside edge of the frustoconical surface 96 and perpendicular to the axis 88. Raised step 100 extends above the surface 98 and is defined by a generally rectangular shaped ledge 102 and step surface 104. Rectangular shaped step 100 is slightly smaller than the rectangular shaped slot 68 and, when retainer 44 is assembled with the button 42 and is in its detached position, the disk shaped surface 98 abuts the disk shaped surface 62 and the step 100 extends into the rectangular slot 68. However, when retainer 44 is rotated 90° about its longitudinal axis 88 and placed in its attached position, the step surface 104 abuts the disk shaped surface 62 thereby axially displacing the disk shaped surface 98 from the disk shaped surface 62 a distance equal to the ledge 102. See FIG. 20.

An exterior generally cylindrical surface 106 extends interior of the outside edge of the frustoconical surface 96. A tool engagement slot 108 extends from the surface 106 into the tool engagement head 90 and is adapted to be engaged with a tool such as a screwdriver or a coin whereby the retainer 44 can be rotated about its longitudinal axis 88. Of course, other tool engagement shapes can be formed into the head 90 for accommodating other toots including but not limited to, for example, phillips screwdriver slots, a hex bolt head, etc.

Rectangular shaped engagement boss 92 forms a T-shape with the shaft 94. Boss 92 is defined by a rear end terminal surface 110, left and right side surfaces 112, 114, abutment surfaces 116, 117 and T-end surfaces 118. Preferably, the rear end surface 110 and the T-end surfaces 118 are joined by angled surfaces 120 so that, when the retainer 44 is rotated to its attached position as shown in FIG. 2, the angled surfaces 120 accommodate the shape of and allow the boss 92 to better fit within the longitudinal extending cavities 32 of common T-slot extrusion members 14.

A rounded surface 122 is provided between the right side surface 114 and the abutment surface 116, and a rounded surface 124 is provided between the left side surface 112 and the abutment surface 117. When retainer 44 is rotated from its detached position as shown in FIG. 19 whereat boss 92 is aligned with the longitudinal slot 26 to its attached position as shown in FIGS. 2 and 20 whereat boss 92 is perpendicular to the longitudinal slot 26, rounded surfaces 122, 124 slide against the interior rounded edge surfaces 40 for thereby smoothly transitioning the abutment surfaces 116, 117 over and onto the interior wall surfaces 34 of the T-slot extrusion members 14.

A left side stop surface 126 is provided perpendicular to and adjacent the abutment surface 116 axially along the shaft 94, and a right side stop surface 128 is provided perpendicular to and adjacent the abutment surface 117 axially along the shaft 94. When the retainer 44 is rotated from its detached position as shown in FIG. 19 whereat boss 92 is aligned with the longitudinal slot 26 to its attached position as shown in FIGS. 2 and 20 whereat boss 92 is perpendicular to the longitudinal slot 26, the left and right side stop surfaces 126, 128 abut the terminal nosing 36 of the T-slot projecting longitudinal wills 30 thereby further rotation of the retainer 44 and also providing the user of the fastener 10 a positive tactile indication that the retainer is, in fact, in its attached position.

Figures 9, 10:
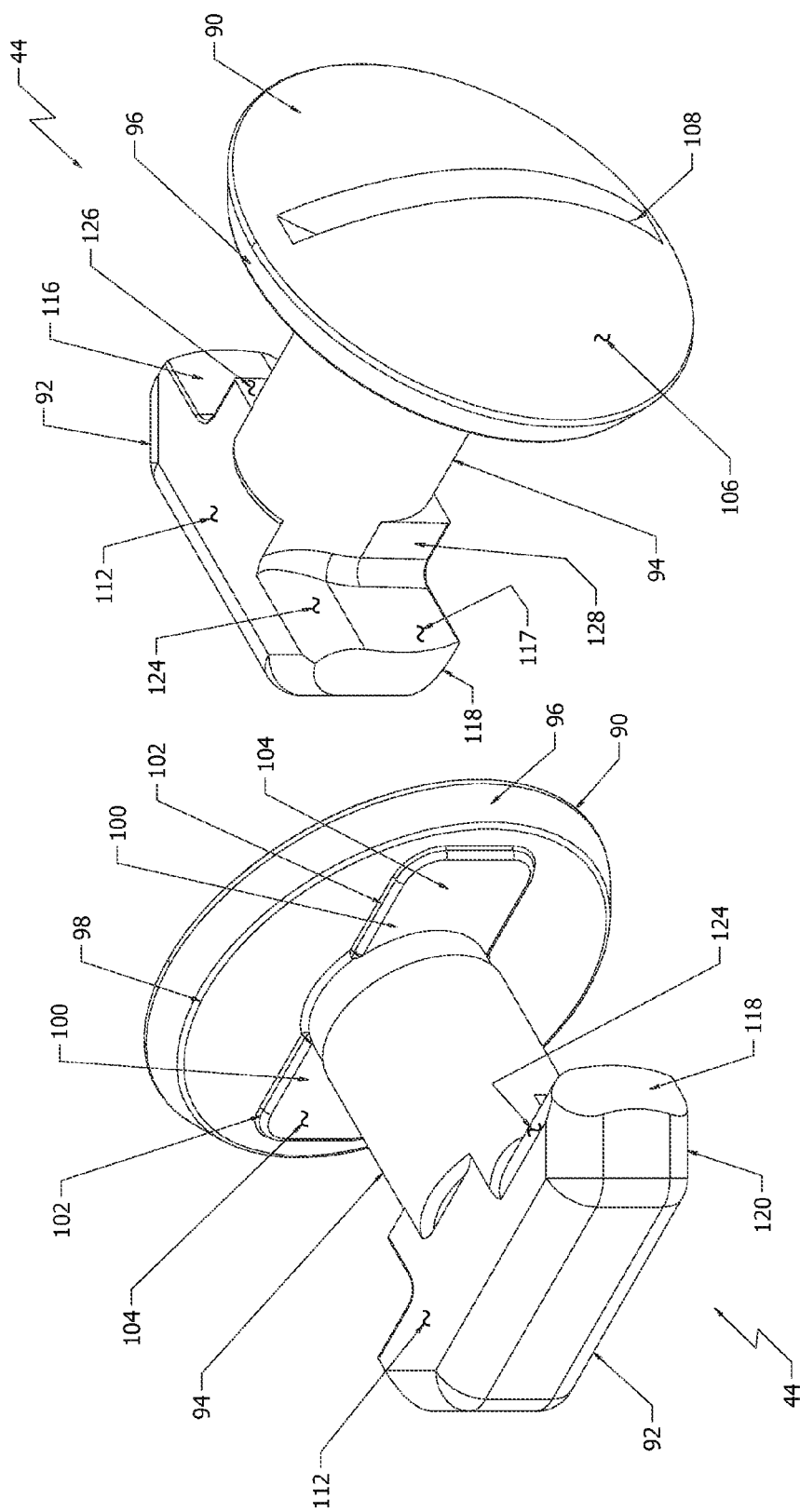
FIG. 9 is a perspective view of a retainer portion of a fastener shown in FIG. 1.
FIG. 10 is a another perspective view of the retainer portion shown in FIG. 9.
Figure 15:
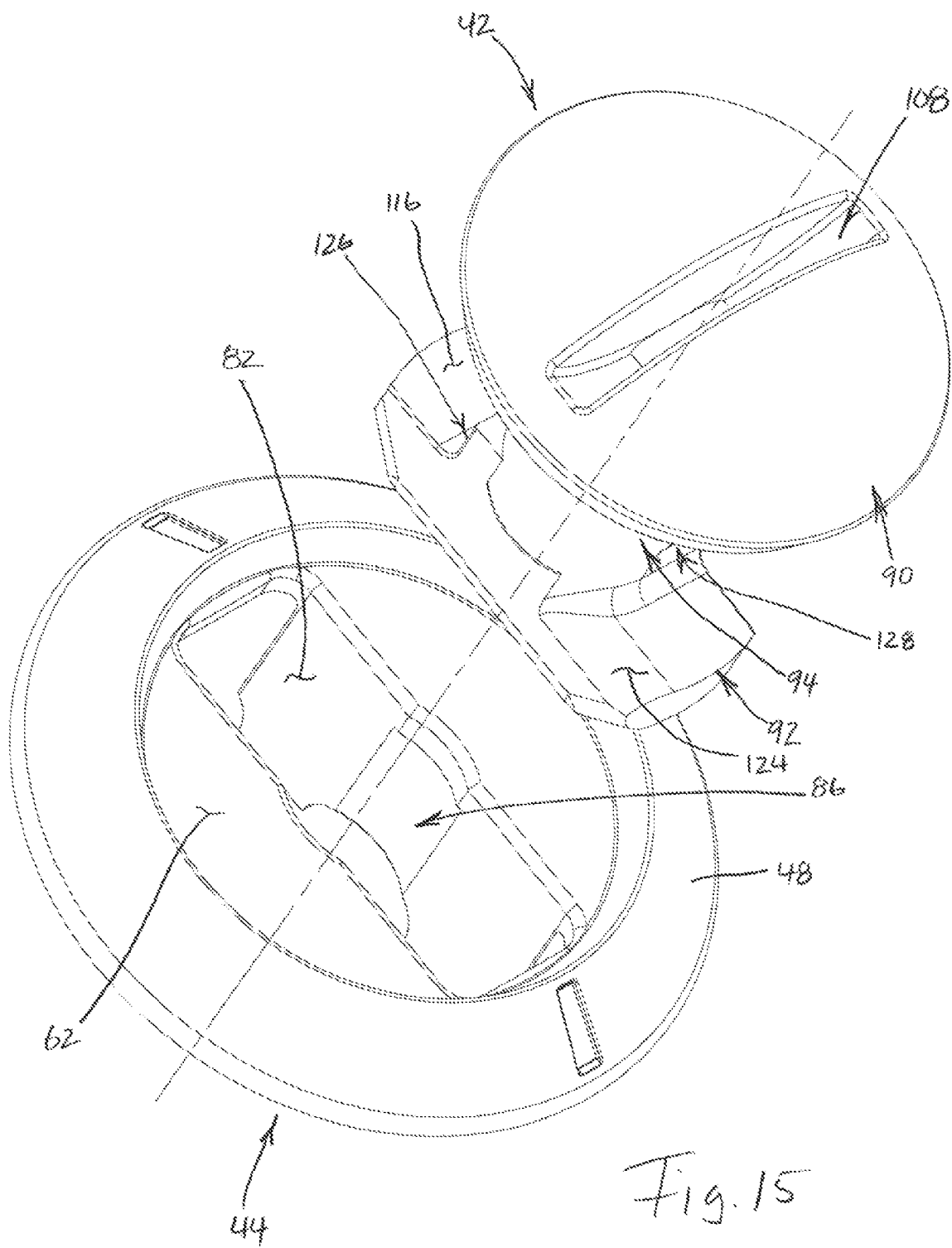
FIG. 15 is a perspective view of the retainer and button portions aligned for but just prior to assembly thereof for forming the fastener.
Figure 16:
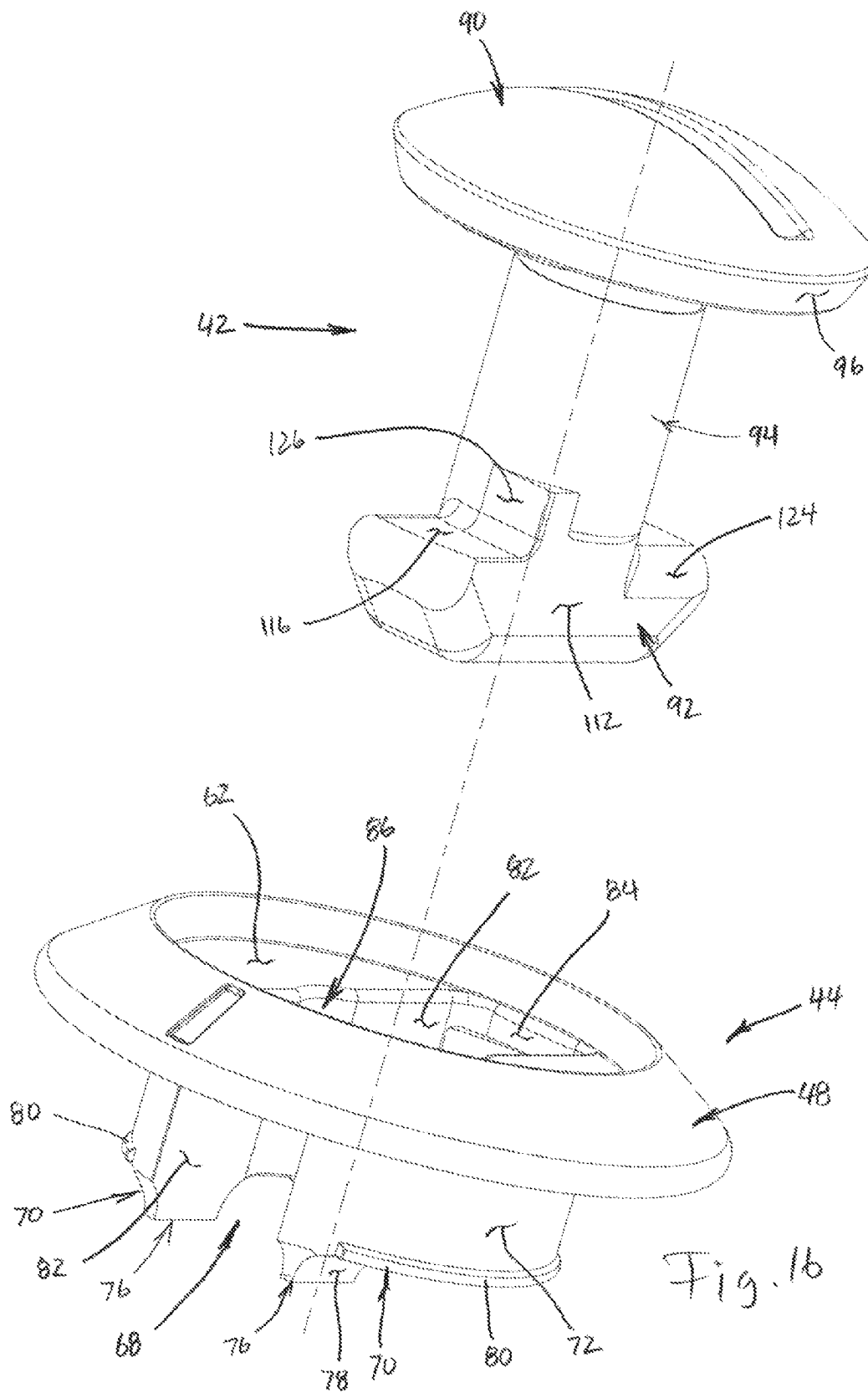
FIG. 16 is a perspective view similar to FIG. 15 but from a different angle.
Figure 18:
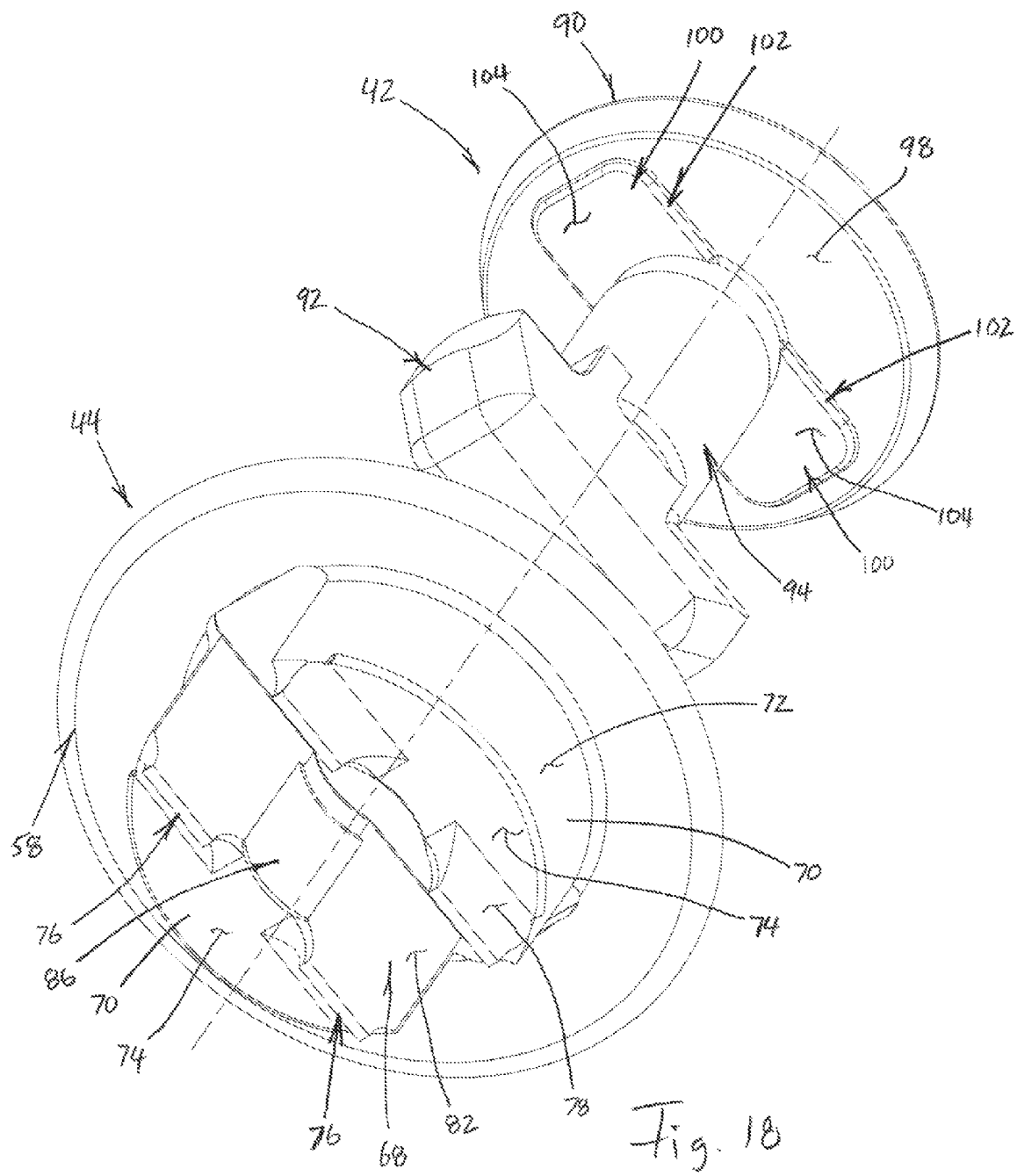
FIG. 18 is a perspective view similar to FIG. 15 but from yet another different angle.

It is noted that as best seen in FIGS. 10, 12 and 14, the rectangular shaped engagement boss 92 is radially aligned with the rectangular shaped raised step 100. The rectangular shaped boss 92 is also slightly smaller than the rectangular shaped slot 68 whereby it can be received therethrough. Also, the shaft 94 diameter SD is sized so that the shaft 94 is slindingly received and retained between and within the axially extending troughs 86 of the projections 70 and so that the shaft 94 is rotatable about its longitudinal axis 88.

The shaft axial distance SX extending between the abutment surfaces 116, 117 of the retainer 44 and the annular abutment surface 58 of the button 42 in its free state as shown in FIGS. 9-14 is slightly less than the overall added thickness of a longitudinal wall 30 and the thickness PT of the planar portion 18. More particularly and yet more preferably, after the retainer 44 is received in and assembled with the button 42, in their detached position and free state as shown in FIG. 19, the axial distance PX between the terminal end surfaces 74 and the annular abutment surface 58 is slightly less than the thickness PT of the planar portion 18, and the axial distance WX between the abutment surfaces 116, 117 and the terminal end surfaces 74 is slightly less than the thickness of the longitudinal walls 30. As should now be appreciated, in this manner, when retainer 44 is placed in its attached position as shown in FIG. 20, longitudinal watts 30 are sandwiched and clamped/compressed between the abutment surfaces 116, 117 and the terminal end surfaces 74 and the object planar portion 18 is sandwiched and clamped/compressed between the structural member exterior side surface 28 and annular abutment surface 58.

As should now also be appreciated, fastener 10 is assembled by inserting the abutment boss 92 and shaft 94 through the depression 60 of the tool engagement head 90 and through the rectangular slot 68 between the projections 70 and placing the raised step 102 into the rectangular slot 68 and the surface 98 adjacent the surface 62. For attaching the planar portion 18 to the channeled structural member 14, either before or after the assembly of button 42 and retainer 44, the button projections 70 are inserted through the planar portion hole 16 causing the semicircular shoulders 82 to abut the hole chamfered edges 24 along the inner surface 20 of the planar portion 18. The engagement boss 92 is then inserted into the structural member longitudinal slot 26 and the cavity 32, as shown in FIG. 19, causing the alignment tabs 76 to at least partially project into the slot 26 and placing the planar portion inner surface 20 adjacent the structural member exterior surface 28.

The tool engagement slot 108 is then engaged with a tool and the retainer 44 is rotated clockwise 90° about its longitudinal axis 88 until the stop surfaces 126, 128 abut a respective terminal nosing 36. As the retainer 44 is rotated, the rounded surfaces 122, 124 slidingly engage respective interior rounded edge surfaces 40 and, in view of the dimensions mentioned hereinabove, cause the engagement boss 92 to be axially displaced away from the button disk shaped section 48 and the retainer head 90. In the final attachment position as shown in FIG. 20 whereat boss 92 is located perpendicular to the longitudinal slot 26 and the boss abutment surfaces 116, 117 abut the interior wall surfaces 34 of the channeled structural member 14, the shaft 94 is placed in tension thereby axially expanding, and both the engagement boss 92 and the frustoconical abutment wall 52 flex axially. Accordingly, the longitudinal walls 30 of the channeled structural member 14 are sandwiched and clamped/compressed between the abutment surfaces 116, 117 and the terminal end surfaces 74 of the button 42, and the object planar portion 18 is sandwiched and clamped/compressed between the structural member exterior side surface 28 and the annular abutment surface 58 of button 42.

As should now be appreciated, in the attachment position, the planar portion 18 and object 12 are securely attached to the channeled structural member 14 with the fastener 10. However, one skilled in the art should now also appreciate that, by controlling and varying the several dimensions described hereinabove, the compression stress on the planar portion 18 can be controlled and increased or eliminated as may be needed or desired. Similarly, the clamping/compressive force applied to the structural member longitudinal walls 30 can be decreased or increased as may be needed for less or more securely attaching the fastener 10 thereto.

Should it be desired to detach the object 12 from the channeled structural member 14, the above described attachment process can simply be reversed and the fastener 10 can be removed from the channeled structural member 14 and the planar portion 18.

Finally, it is noted that button 42 and retainer 44 are preferably made by injection molding although it is contemplated that they can also be made by other manufacturing methods including, for example, cast forming, 3D printing, machining, etc. Button 42 and retainer 44 are preferably made of nylon or other plastics although it is contemplated that they can also be made of other materials including steel, copper, etc.

While this invention has been described as having an exemplary design, the present invention may be further modified within the spirit and scope of this disclosure. This application is therefore intended to cover any variations, uses, or adaptations of the invention using its general principles.

What is claimed is:

1. A fastener for attaching objects to channeled members, wherein the objects have a hole extending therethrough and the channeled members have a longitudinal slot formed between projecting longitudinal walls, said fastener comprising:
   a button adapted to extend through the object hole and having an abutment wall adapted to abut the object;
   a retainer operatively associated with said button and adapted to rotate about an axis; and,
   said retainer including an engagement boss adapted to extend through the channeled member slot and also, upon rotation of said retainer about said axis, engage the projecting walls thereof, whereby the object is sandwiched between said button abutment wall and the channeled member.

2. The fastener of claim 1 wherein said button further includes an abutment surface adapted to abut the channeled member and wherein, upon rotation of said retainer about said axis, the channeled member walls are sandwiched between said button abutment surface and said engagement boss.

3. The fastener of claim 2 wherein said button includes alignment tabs adapted to extend into the channeled member slot.

4. The fastener of claim 1 wherein said retainer further includes a raised step adapted to engage a button surface when said retainer is rotated about said axis, whereby a retainer portion between said engagement boss and said button is placed in tension.

5. The fastener of claim 1 wherein said retainer engagement boss further includes a rounded surface adapted to slidingly engage and raise said engagement boss over the projecting walls, whereby a retainer portion between said engagement boss and said button is placed in tension.

6. The fastener of claim 1 wherein said retainer includes a stop surface adapted to engage a channeled member projecting wall when said retainer is rotated about said axis thereby preventing further rotation of said retainer.

7. The fastener of claim 1 wherein said button includes a shoulder adapted to engage the object and retain the button thereon prior to said rotation of said retainer about said axis.

8. The fastener of claim 1 wherein said button includes an axially extending slot, said retainer including a head at a terminal end opposite said engagement boss and wherein said retainer extends through said button slot and said head abuts said button.

9. The fastener of claim 8 wherein said button further includes an abutment surface adapted to abut the channeled member and wherein, upon rotation of said retainer about said axis, the channeled member walls are sandwiched between said button abutment surface and said engagement boss.

10. The fastener of claim 8 wherein said button includes alignment tabs adapted to extend into the channeled member slot.

11. The fastener of claim 8 wherein said retainer head further includes a raised step adapted to engage a button surface when said retainer is rotated about said axis, whereby a retainer portion between said engagement boss and said button is placed in tension.

12. The fastener of claim 8 wherein said retainer engagement boss further includes a rounded surface adapted to slidingly engage and raise said engagement boss over the projecting walls, whereby a retainer portion between said engagement boss and said button is placed in tension.

13. The fastener of claim 8 wherein said retainer includes a stop surface adapted to engage a channeled member projecting wall when said retainer is rotated about said axis thereby preventing further rotation of said retainer.

14. The fastener of claim 8 wherein said button includes a shoulder adapted to engage the object and retain the button thereon prior to said rotation of said retainer about said axis.

15. The fastener of claim 8 wherein:
   said button includes an abutment surface adapted to abut the channeled member and wherein, upon rotation of said retainer about said axis, the channeled member walls are sandwiched between said button abutment surface and said engagement boss;
   said button includes alignment tabs adapted to extend into the channeled member slot;
   said retainer head includes a raised step adapted to engage a button surface when said retainer is rotated about said axis;
   said retainer engagement boss includes a rounded surface adapted to slidingly engage and raise said engagement boss over the projecting walls;
   said retainer includes a stop surface adapted to engage a channeled member projecting wall when said retainer is rotated about said axis thereby preventing further rotation of said retainer; and,
   wherein said button includes a shoulder adapted to engage the object and retain the button thereon prior to said rotation of said retainer about said axis.

16. A fastener for attaching objects to channeled members, wherein the objects have a hole extending therethrough and the channeled members have a longitudinal slot formed between projecting longitudinal walls, said fastener comprising:
- a button adapted to extend through the object hole and to be attached to the object;
- said button having an abutment surface adapted to abut the channeled member;
- a retainer operatively associated with said button and adapted to rotate about an axis; and,
- said retainer including an engagement boss adapted to extend through the channeled member slot and also, upon rotation of said retainer about said axis, engage the projecting walls thereof, whereby the channeled member walls are sandwiched between said button abutment surface and said engagement boss.

17. The fastener of claim 16 wherein said button includes alignment tabs adapted to extend into the channeled member slot.

18. The fastener of claim 16 wherein said retainer further includes a raised step adapted to engage a button surface when said retainer is rotated about said axis, whereby a retainer portion between said engagement boss and said button is placed in tension.

19. The fastener of claim 16 wherein said retainer engagement boss further includes a rounded surface adapted to slidingly engage and raise said engagement boss over the projecting walls, whereby a retainer portion between said engagement boss and said button is placed in tension.

20. The fastener of claim 16 wherein said retainer includes a stop surface adapted to engage a channeled member projecting wall when said retainer is rotated about said axis thereby preventing further rotation of said retainer.

21. The fastener of claim 16 wherein said button includes a shoulder adapted to engage the object and retain the button thereon prior to said rotation of said retainer about said axis.

22. The fastener of claim 16 wherein said button includes an axially extending slot, said retainer including a head at a terminal end opposite said engagement boss and wherein said retainer extends through said button slot and said head abuts said button.

23. The fastener of claim 22 wherein said button includes alignment tabs adapted to extend into the channeled member slot.

24. The fastener of claim 23 wherein said retainer further includes a raised step adapted to engage a button surface when said retainer is rotated about said axis, whereby a retainer portion between said engagement boss and said button is placed in tension.

25. The fastener of claim 23 wherein said retainer engagement boss further includes a rounded surface adapted to slidingly engage and raise said engagement boss over the projecting walls, whereby a retainer portion between said engagement boss and said button is placed in tension.

26. The fastener of claim 23 wherein said retainer includes a stop surface adapted to engage a channeled member projecting wall when said retainer is rotated about said axis thereby preventing further rotation of said retainer.

27. The fastener of claim 23 wherein said button includes a shoulder adapted to engage the object and retain the button thereon prior to said rotation of said retainer about said axis.

28. The fastener of claim 23 wherein:
- said button includes alignment tabs adapted to extend into the channeled member
- wherein said retainer includes a raised step adapted to engage a button surface when said retainer is rotated about said axis;
- said retainer engagement boss includes a rounded surface adapted to slidingly engage and raise said engagement boss over the projecting walls;
- wherein said retainer includes a stop surface adapted to engage a channeled member projecting wall when said retainer is rotated about said axis thereby preventing further rotation of said retainer; and,
- wherein said button includes a shoulder adapted to engage the object and retain the button thereon prior to said rotation of said retainer about said axis.

29. A fastener for attaching objects to channeled members, wherein the objects have a planar portion and a hole extending through the planar portion and the channeled members have a longitudinal slot formed between projecting longitudinal walls, said fastener comprising:
- a button adapted to extend through the planar portion hole and having an abutment wall adapted to abut the planar portion;
- a retainer operatively associated with said button and adapted to rotate about an axis; and,
- said retainer including an engagement boss adapted to extend through the channeled member slot and also, upon rotation of said retainer about said axis, engage the projecting walls thereof, whereby the object planar portion is sandwiched between said button abutment wall and the channeled member.

30. The fastener of claim 29 wherein said button includes an axially extending slot, said retainer including a head at a terminal end opposite said engagement boss and wherein said retainer extends through said button slot and said head abuts said button.

31. The fastener of claim 30 wherein said button further includes an abutment surface adapted to abut the channeled member and wherein, upon rotation of said retainer about said axis, the channeled member walls are sandwiched between said button abutment surface and said engagement boss.

32. The fastener of claim 31 wherein said button includes alignment tabs adapted to extend into the channeled member slot, 33. The fastener of claim 31 wherein said retainer head further includes a raised step adapted to engage a button surface when said retainer is rotated about said axis, whereby a retainer portion between said engagement boss and said button is placed in tension.

34. The fastener of claim 31 wherein said retainer engagement boss further includes a rounded surface adapted to slidingly engage and raise said engagement boss over the projecting walls, whereby a retainer portion between said engagement boss and said button is placed in tension.

35. The fastener of claim 31 wherein said retainer includes a stop surface adapted to engage a channeled member projecting wall when said retainer is rotated about said axis thereby preventing further rotation of said retainer.

36. The fastener of claim 31 wherein said button includes a shoulder adapted to engage the object and retain the button thereon prior to said rotation of said retainer about said axis.

* * * * *

UNITED STATES PATENT AND TRADEMARK OFFICE
CERTIFICATE OF CORRECTION

PATENT NO. : 9,022,712 B2  
APPLICATION NO. : 13/943954  
DATED : May 5, 2015  
INVENTOR(S) : James W. Klopfenstein, II Page 1 of 1

It is certified that error appears in the above-identified patent and that said Letters Patent is hereby corrected as shown below:

In the Specification

Column 1, line 39, insert --walls-- after longitudinal

Column 3, line 57, change "ell" to --well--

Column 4, line 30, change "72" to --22--

Column 6, line 5, change "wills" to --walls--

Column 6, line 5, insert --preventing-- after "thereby"

Column 6, line 32, change "watts" to --walls--

Signed and Sealed this  
Eighteenth Day of August, 2015

Michelle K. Lee  
*Director of the United States Patent and Trademark Office*